(12) United States Patent
Wright et al.

(10) Patent No.: US 7,613,376 B2
(45) Date of Patent: Nov. 3, 2009

(54) OPTICAL FIBER FANOUT DEVICES AND METHODS FOR FORMING THE SAME

(75) Inventors: William Wright, Fuquay Varina, NC (US); David Radliff, Holly Springs, NC (US); Gary Adams, Holly Springs, NC (US); Julian Mullaney, Raleigh, NC (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 12/008,029

(22) Filed: Jan. 8, 2008

(65) Prior Publication Data
US 2009/0060440 A1 Mar. 5, 2009

Related U.S. Application Data

(60) Provisional application No. 60/966,300, filed on Aug. 27, 2007.

(51) Int. Cl.
G02B 6/00 (2006.01)
(52) U.S. Cl. ........................................ 385/135; 385/134
(58) Field of Classification Search .......... 385/134–140
See application file for complete search history.

(56) References Cited

U.S. PATENT DOCUMENTS

| | | | | |
|---|---|---|---|---|
| 5,090,792 A | * | 2/1992 | Koht et al. | 385/135 |
| 5,212,761 A | * | 5/1993 | Petrunia | 385/135 |
| 5,323,480 A | * | 6/1994 | Mullaney et al. | 385/135 |
| 5,734,777 A | * | 3/1998 | Merriken et al. | 385/135 |
| 6,709,168 B2 | * | 3/2004 | Imabayashi et al. | 385/135 |
| 6,829,425 B2 | * | 12/2004 | Barthel et al. | 385/135 |
| 2006/0188210 A1 | * | 8/2006 | Zimmel | 385/135 |

OTHER PUBLICATIONS

OFS, "Fiber Optic Mini Fanouts, Quick and Easily Facilitates the Transition of Cable Ribbon", 2 pages, 2002.
Sumitomo's Lightray MPX™ Fanout, Multi-fiber Connector to Single-fiber Connectors, 2 pages (admitted prior art).
MPO Connector: Optical Fiber Connector: Telecommunications: Furukawa Electric, http://www.furukawa.co.jp/connector/mpo.htm, 2 pages, (admitted prior art).
ADC, "Challenges of Cold Temperatures on OSP Cable Assemblies for FTTP", 5 pages, 2004.
Corning Cable Systems, Buffer Tube Fan-Out Kits, A LANscape® Solutions Product, 2 pages, 2003.

* cited by examiner

*Primary Examiner*—Charlie Peng
(74) *Attorney, Agent, or Firm*—Myers Bigel Sibley & Sajovec

(57) ABSTRACT

Optical fiber fanout devices include a housing having a fiber telescoping cavity therein. An optical fiber tubing receiving opening in the housing extends to the fiber telescoping cavity. The optical fiber tubing receiving opening is configured to secure a plurality of optical fiber tubes therein. An optical fiber receiving opening in the housing also extends to the cavity. The optical fiber receiving opening is displaced from the optical fiber tubing receiving opening by a distance selected to define an arc for an optical fiber extending from the optical fiber receiving opening to the optical fiber tubing receiving opening that exceeds a minimum bend radius for the optical fiber.

25 Claims, 7 Drawing Sheets

OPTICAL FIBER FANOUT DEVICES AND METHODS FOR FORMING THE SAME

RELATED APPLICATIONS

The present application claims the benefit of and priority from U.S. Provisional Application No. 60/966,300, filed Aug. 27, 2007, the disclosure of which is hereby incorporated herein in its entirety by reference.

BACKGROUND OF THE INVENTION

The present invention relates to optical fiber products and, more particularly, to optical fiber storage transition products and methods for using the same.

Optical fiber networks are increasingly being installed to support high-speed voice and data communications. Increasingly, the optical fiber coupling is being expanded out from the central office of the communication service provider companies, such as Regional Bell Operating Companies (RBOCs) to the subscriber locations, such as homes or businesses, where conventional copper wiring was conventionally used. Such alternate methods of providing bandwidth to subscriber locations are often referred to in the telecoms industry as Fiber to the Home (FTTH)

Optical fanouts are one of the components that are commonly used in optical fiber telecommunication systems. Optical fanouts are a type of device that provides a physical transition between cabled fibers that, typically, have only a 250 um coating, and individually jacketed and connectorized fibers. Fanouts are typically employed in Central Offices and in outside plant applications where individual fibers need to interface with telecommunications equipment or devices via a fiber optic connector.

Optical fanouts have been commercially available for many years. One common type of fanout design uses 900 um (micron) outer diameter loose buffer furcation tubes that are sleeved over the individual 250 um coated fibers to provide physical protection during handling of the connectorized pigtails. Such fanouts are typically potted. Also, devices originally designed for indoor use have been extended into outside plant environments, which have revealed a cold temperature sensitivity in some designs. The temperature sensitivity is generally due to differential thermal expansion moduli of the materials comprising the fanout. When exposed to typically specified low temperature environments (i.e., −40° C.) the optical loss of some fibers in a fanout can increase to unacceptable levels.

SUMMARY OF THE INVENTION

Embodiments of the present invention include optical fiber fanout devices including a housing having a fiber telescoping cavity therein. An optical fiber tubing receiving opening in the housing extends to the fiber telescoping cavity. The optical fiber tubing receiving opening is configured to secure a plurality of optical fiber tubes therein. An optical fiber receiving opening in the housing also extends to the cavity. The optical fiber receiving opening is displaced from the optical fiber tubing receiving opening by a distance selected to define an arc for an optical fiber extending from the optical fiber receiving opening to the optical fiber tubing receiving opening that exceeds a minimum bend radius for the optical fiber.

In other embodiments, the optical fiber tubing receiving opening includes an insertable furcation tube holding block configured to receive a plurality of furcation tubes fixedly therein. The housing may further include a deformable holding block receiving member configured to slidably receive the furcation tube holding block and to limit longitudinal movement of the furcation tube holding block relative to the fiber telescoping cavity. The furcation tube holding block may include a furcation tube receiving passageway extending longitudinally therethrough configured to receive a plurality of furcation tubes and an adhesive receiving passageway therein extending to the furcation tube receiving passageway configured to receive an adhesive for securing the plurality of furcation tubes in the furcation tube holding block. First and second adhesive receiving regions connecting to the furcation tube receiving passageway may be provided proximate longitudinally displaced ends of the furcation tube receiving passageway that are configured to limit wicking of adhesive flowing from the adhesive receiving passageway through the furcation tube receiving passageway.

In further embodiments, the furcation tube holding block is a plastic material that allows light to be transmitted therethrough to cure adhesive in the adhesive receiving passageway and the furcation tube receiving passageway. The furcation tube holding block may include a central member defining a first and second passageway, each configured to receive a plurality of furcation tubes arrayed across a width of the furcation tube holding block at a substantially uniform spacing, with a substantially uniform thickness wall between the first and second passageway defining an offset nested relationship between furcation tubes placed in the first and second passageways. The furcation tube holding block may further include a bottom cover hingedly connected to the central member and having an open position allowing insertion of furcation tubes in the first passageway and a closed position extending over inserted furcation tubes in the first passageway and a top cover hingedly connected to the central member having an open position allowing insertion of furcation tubes in the second passageway and a closed position extending over inserted furcation tubes in the second passageway. A first adhesive passageway opening may be provided in the top cover configured to allow adhesive to flow into the second passageway and a second adhesive passageway opening may be provided in the central member configured to allow adhesive to flow from the second passageway into the first passageway.

In other embodiments the furcation tube holding block includes an angled endface positioned facing the fiber telescoping cavity. The deformable holding block receiving member includes an angled retaining member configured to engage the angled endface of the furcation tube holding block to limit longitudinal movement of the furcation tube holding block into the fiber telescoping cavity.

In further embodiments, the optical fiber receiving opening includes an insertable multi-fiber holding block having a fiber receiving passageway extending therethrough to the fiber telescoping cavity configured to receive a plurality of optical fibers. The multi-fiber holding block may be a ribbon holding block and the fiber receiving passageway may be a longitudinally extending channel having a height exceeding its width configured to receive an optical fiber ribbon cable therein. The multi-fiber holding block may include an adhesive receiving passageway therein extending to the fiber receiving passageway configured to receive an adhesive for securing the plurality of optical fibers in the multi-fiber holding block and first and second adhesive receiving regions connecting to the fiber receiving passageway proximate longitudinally displaced ends of the fiber receiving passageway that are configured to terminate wicking of adhesive flowing from the adhesive receiving passageway through the fiber receiving passageway.

In other embodiments, the multi-fiber holding block is a loose tube holding block and the fiber receiving passageway has a longitudinally extending opening on an upper portion thereof configured to allow passage of a loose tube containing a plurality of optical fibers into the fiber receiving passageway. The housing may further include a second deformable holding block receiving member configured to slidably receive the multi-fiber holding block and to limit longitudinal movement of the multi-fiber holding block relative to the fiber telescoping cavity, wherein the second deformable holding block receiving member is positioned at a distance from the first deformable holding block receiving member to define the arc for an optical fiber extending from the optical fiber receiving opening to the optical fiber tubing receiving opening. The furcation tube holding block and the multi-fiber holding block may have a common footprint and the deformable holding block receiving members may be configured to interchangeably receive either the furcation tube holding block or the multi-fiber holding block.

In further embodiments, the first deformable holding block receiving member is one of a first plurality of deformable holding block receiving members in the housing and the second deformable holding block receiving member is one of a second plurality of deformable holding block receiving members in the housing. Ones of the first plurality of deformable holding block receiving members are positioned at a distance from corresponding ones of the second plurality of deformable holding block receiving members to define respective arcs for optical fibers extending therebetween through the fiber telescoping cavity. The optical fiber fanout device includes a plurality of pairs of furcation tube holding blocks and multi-fiber holding blocks positioned in corresponding ones of the deformable holding block receiving members.

In other embodiments, groups of a plurality of optical fibers are retained in each of the multi-fiber holding blocks and a plurality of furcating tubes are fixedly secured in each of the furcation tube holding blocks. Singulated ones of the optical fibers extend along the respective arcs from each of the multi-fiber holding blocks into corresponding associated ones of the furcation tubes fixedly secured in corresponding ones of the furcation tube holding blocks. The groups of optical fibers may be optical fiber ribbons and/or optical fiber loose tubes including a plurality of optical fibers.

In further embodiments, the optical fiber fanout device includes a plurality of the optical fiber tubing receiving openings and a plurality of the optical fiber receiving openings, ones of which are positioned at a distance from corresponding ones of the plurality of optical fiber tubing receiving openings to define respective arcs for optical fibers extending therebetween through the fiber telescoping cavity. The housing may be configured as a tray and the tray may be to be secured in a stack of optical fiber fanout devices. The deformable holding block receiving member may be in a bottom of the tray and the tray may include standoffs extending from the bottom of the tray in a direction away from the fiber telescoping cavity, the standoffs being positioned to locate the tray at an angle allowing deformation of the deformable holding block receiving member to allow insertion of the furcation tube holding block therein. The tray may include standoff receiving members positioned to receive standoffs extending from another tray stacked thereon.

In some embodiments, the furcation tubes are adhesively secured in the furcation tube holding block and the furcation tube holding block is configured to limit movement of the furcation tubes in a direction causing peeling of the adhesive in the furcation tube holding block. The plurality of optical fibers are adhesively secured in the multi-fiber holding block and the multi-fiber holding block is configured to limit movement of the plurality of optical fibers in a direction causing peeling of the adhesive in the multi-fiber holding block. Where the fibers are contained in a loose tube, movement of the plurality of optical fibers in a direction causing peeling of the adhesive is limited but, as the fibers are not constrained against movement within the tube, such movement is not prevented. However, such movement within the loose tube does not cause peeling of the adhesive.

In further embodiments, the optical fiber tubes are adhesively secured in the optical fiber tubing receiving opening and the optical fiber tubing receiving opening is configured to limit movement of the optical fiber tubes in a direction causing peeling of the adhesive in the optical fiber tubing receiving opening. The optical fiber is adhesively secured in the optical fiber receiving opening and the optical fiber receiving opening is configured to limit movement of the optical fiber in a direction causing peeling of the adhesive in the optical fiber receiving opening.

In yet other embodiments, methods of forming an optical fiber fanout device include providing a housing having a fiber telescoping cavity and a first and second deformable holding block receiving member therein, the second deformable holding block receiving member being positioned at a distance from the first deformable holding block receiving member to define an arc for an optical fiber extending therebetween through the fiber telescoping cavity. A multi-fiber grouping of a plurality of optical fibers is positioned in a multi-fiber holding block configured to be received in the first and/or second deformable holding block receiving member. A plurality of furcation tubes are fixedly secured in a furcation tube holding block configured to be received in the first and/or second deformable holding block receiving member. Ones of a plurality of optical fibers in the multi-fiber grouping are singulated. The singulated ones of the plurality of optical fibers are inserted in corresponding ones of the furcation tubes. The furcation tube holding block is positioned a selected longitudinal distance from the multi-fiber holding block with the singulated optical fibers extending therebetween. The furcation tube holding block is fixedly secured at the selected longitudinal distance from the multi-fiber holding block. In some embodiments, fixedly securing the holding blocks includes terminating the ones of the plurality of optical fibers in the multi-fiber grouping to a connector fixedly secured to corresponding ones of the furcation tubes. After the holding blocks are secured at the selected longitudinal distance from each other, the multi-fiber holding block is inserted in the first deformable holding block receiving member and the furcation tube holding block is inserted in the second deformable holding block receiving member with the singulated optical fibers extending through the fiber telescoping cavity along the defined arc.

In further embodiments, fixedly securing the plurality of furcation tubes and securing the multi-fiber grouping of the plurality of optical fibers includes adhesively securing the furcation tubes and plurality of optical fibers in their respective holding blocks. The multi-fiber grouping may be a loose tube including a plurality of individual optical fibers and singulating ones of the plurality of optical fibers may include removing a selected length of the loose tube to expose the plurality of optical fibers. The multi-fiber grouping may be a ribbon and singulating ones of the plurality of optical fibers may include separating a selected length of the plurality of optical fibers.

DETAILED DESCRIPTION OF EMBODIMENTS OF THE INVENTION

Figure 1:
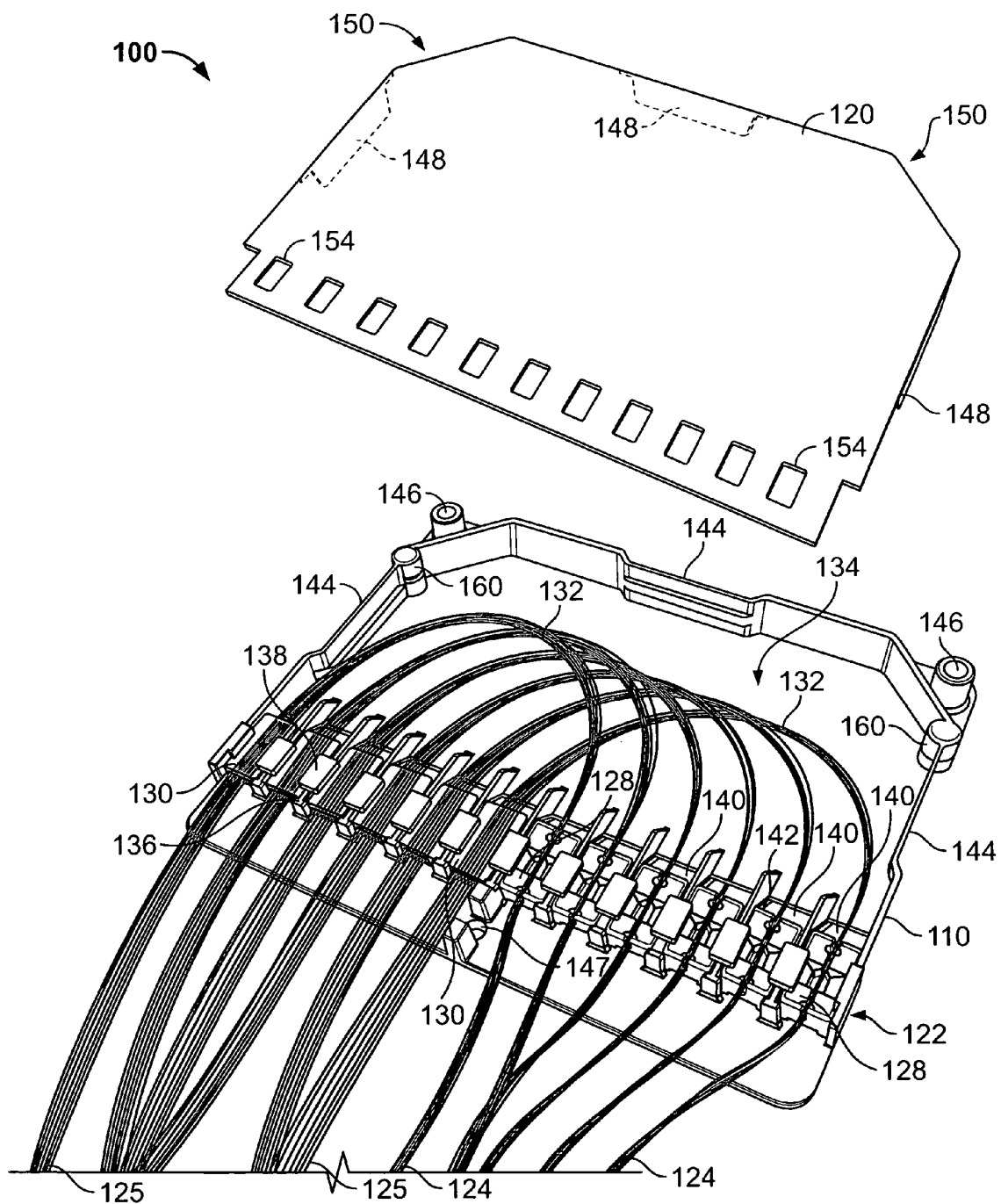
FIG. 1 is a partially exploded perspective view illustrating an optical fiber fanout device according to some embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

In some embodiments of the present invention, optical fanout devices are provided that may exhibit superior temperature versus loss performance, may hold up to 72 fibers or more and may use a novel modular design that may simplify factory production operations. The fanout device, in some embodiments, enables a maximum of 72 fibers (6 groups of 12) to enter and exit the housing on a common plane as illustrated, for example, in the embodiments of FIG. 1, where 6 optical fiber ribbons are shown as entering the fanout device, each of which is shown as including 12 fibers, on the right side as viewed in FIG. 1, then arcing in a half loop through a fiber telescoping zone before exiting on the left of FIG. 1 in individual tubes, where one tube may be provided for each fiber. Each fiber experiences a benign loop inside the housing (i.e., at a radius that does not damage the fiber). The fiber inside the housing is free to move a small amount as, unlike the conventional fanouts described above, it is not potted in place. Such flexing may allow differential thermal expansion and contraction while maintaining performance of the fibers. As such, in some embodiments, problems related to tubing shrinkage and the like may be avoided or reduced through the use of slack coils to accommodate tubing shrinkage and annealed tubing may not be required and sensitivity to tubing temperature variations may be reduced in a fanout device for multiple ribbons.

In some embodiments, modular holding blocks are included that are used to secure either a fiber optic ribbon, a loose tube including a plurality of optical fibers or plastic furcation tubes in the fanout housing. In some embodiments, a process is used that employs the use of a "Light-Cure" adhesive in conjunction with specially selected materials, which may provide for a high efficiency manufacturing methodology. In further embodiments, specially designed apparatuses are provided that minimize process variation and establish a safe operator interface. The fanout device may meet industry standards, such as Telcordia GR-2866.

Optical fiber fanout devices according to some embodiments of the present invention will now be described with reference to FIGS. 1-8. FIG. 1 is a partially exploded perspective view illustrating an optical fiber fanout device 100 according to some embodiments of the present invention. The optical fiber fanout device 100 includes a housing having a base 110 and a cover 120. More particularly, the illustrated base 110 is a tray that is configured to be secured in a stack of optical fiber fanout devices. A plurality of insertable furcation tube holding blocks 130 are shown defining optical fiber tubing receiving openings in the base 110. Also shown is a plurality of multi-fiber holding blocks 128 that define optical fiber receiving openings in the base 110. The holding blocks 130, 128 extend into a fiber telescoping cavity 134 in the base 110.

In the particular embodiments of FIG. 1, six furcation tube holding blocks 130 and a corresponding set of six multi-fiber holding blocks 128 are shown. Each of the multi-fiber holding blocks 128 is displaced from an associated one of the furcation tube holding blocks 130 by a distance selected to define an arc for an optical fiber extending therebetween that exceeds a minimum bend radius for the optical fiber. Thus, as seen in FIG. 1, respective arcs 132 of optical fiber extend through the fiber telescoping cavity 134 between corresponding pairs of the holding blocks 128, 130. As a result, differential thermal expansion and shrinkage characteristics of furcation tubes 125 and the optical fibers extending therein may be accommodated by telescoping of the arcs 132 of optical fiber so as to limit or even prevent degradation of the optical fibers. As a result, lower cost furcation tubes 125 may be used, in some embodiments of the present invention, as shrinkage characteristics thereof are less problematic than with conventional optical fiber fanout devices.

As also seen for the embodiments of FIG. 1, the optical fiber groupings to be separated in the fanout are shown as optical ribbons 124 that are received and secured in the multi-fiber holding blocks 128 and passed therethrough into the fiber telescoping cavity 134. As shown in FIG. 1, the end 122 of the base 110 is fully populated with six associated pairs of holding blocks 128, 130. The ribbons 124 each include a group of twelve optical fibers. Thus, the optical fiber fanout device 100 may enable 72 fibers to enter and exit the device 100 on a common plane. However, it will be understood that lower or higher numbers of fibers may be accommodated in various embodiments of the present invention and, furthermore, that a device 100 configured for a larger number of fibers may be partially populated and used to provide a benign arc allowing telescoping of a smaller number of optical fibers as required.

In the embodiments of FIG. 1, the respective holding blocks 128, 130 are slidably received in respective deformable holding block receiving members having a flexible arm 140. The holding block receiving members are configured to slidably receive the insertable holding blocks 128, 130 and to limit longitudinal movement of the holding blocks 128, 130 relative to the fiber telescoping cavity 134. More particularly, the flexible arm 140 is shown formed integrally with the base 110. The flexible arm 140 includes a retaining member 142 positioned on the arm 140 proximate the fiber telescoping cavity 134 to limit longitudinal movement of the holding blocks 128, 130 into the fiber telescoping cavity 134, for example, when the ribbon 124 or furcation tubes 125 are pushed manually towards the cavity 134. The holding block receiving members further include end-stops 136 and upper retaining tabs 138 configured to limit movement of the holding blocks 128, 130 away from the cavity 134 and away from the base 110, respectively, when the holding block 128, 130 are slidably received in their respective deformable holding block receiving members.

Various features are also provided in the base 110 for receiving the cover (top) 120. In particular, three tab receiving regions 144 are shown configured to receive tabs 148 of the cover 120 therein. In some embodiments, the tabs 148 will be received in the regions 144 so as to lock the cover 120 on the base 110 to limit further operator access to the fiber telescoping cavity 134.

The optical fiber fanout device 100 of the embodiments of FIG. 1 may be attached to an underlying surface (or with a plurality of stacked devices to an underlying surface) using two openings 146 on a back end thereof and one opening 147 centrally located on a front end 122 thereof. The openings 146 are located outside the fiber telescoping cavity 134, with the sidewalls of the base 110 including a thickened portion 160 approximate the angled sidewall portion accommodating the openings 146.

The cover 120 likewise includes angled recesses 150 allowing access to the openings 146. In addition, the cover 120 includes a plurality of openings 154, and cutouts on the end thereof, to accommodate the retaining tabs 138.

Figure 2:
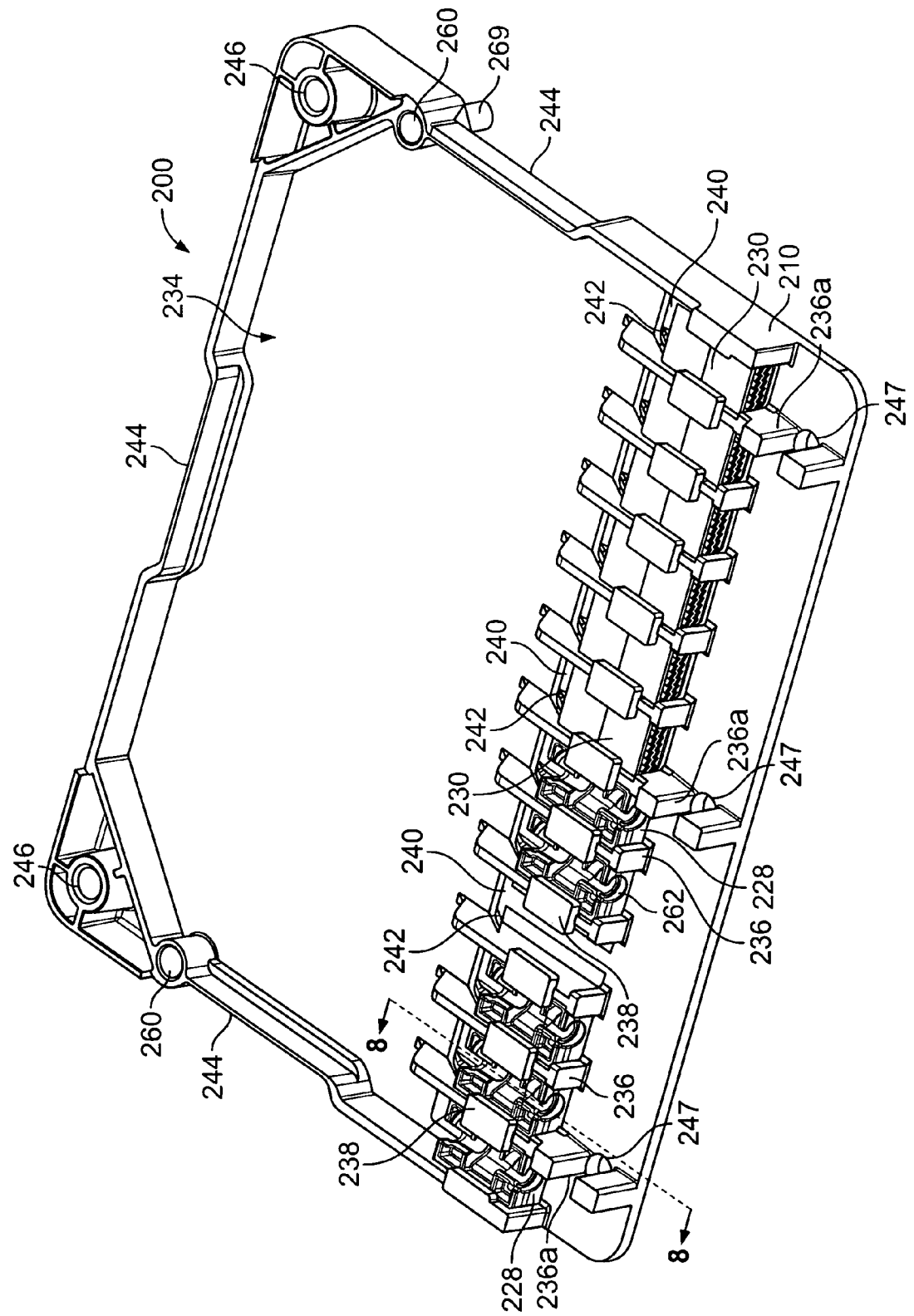
FIG. 2 is a perspective view illustrating an optical fiber fanout device with the cover removed according to further embodiments of the present invention.
Figure 3:
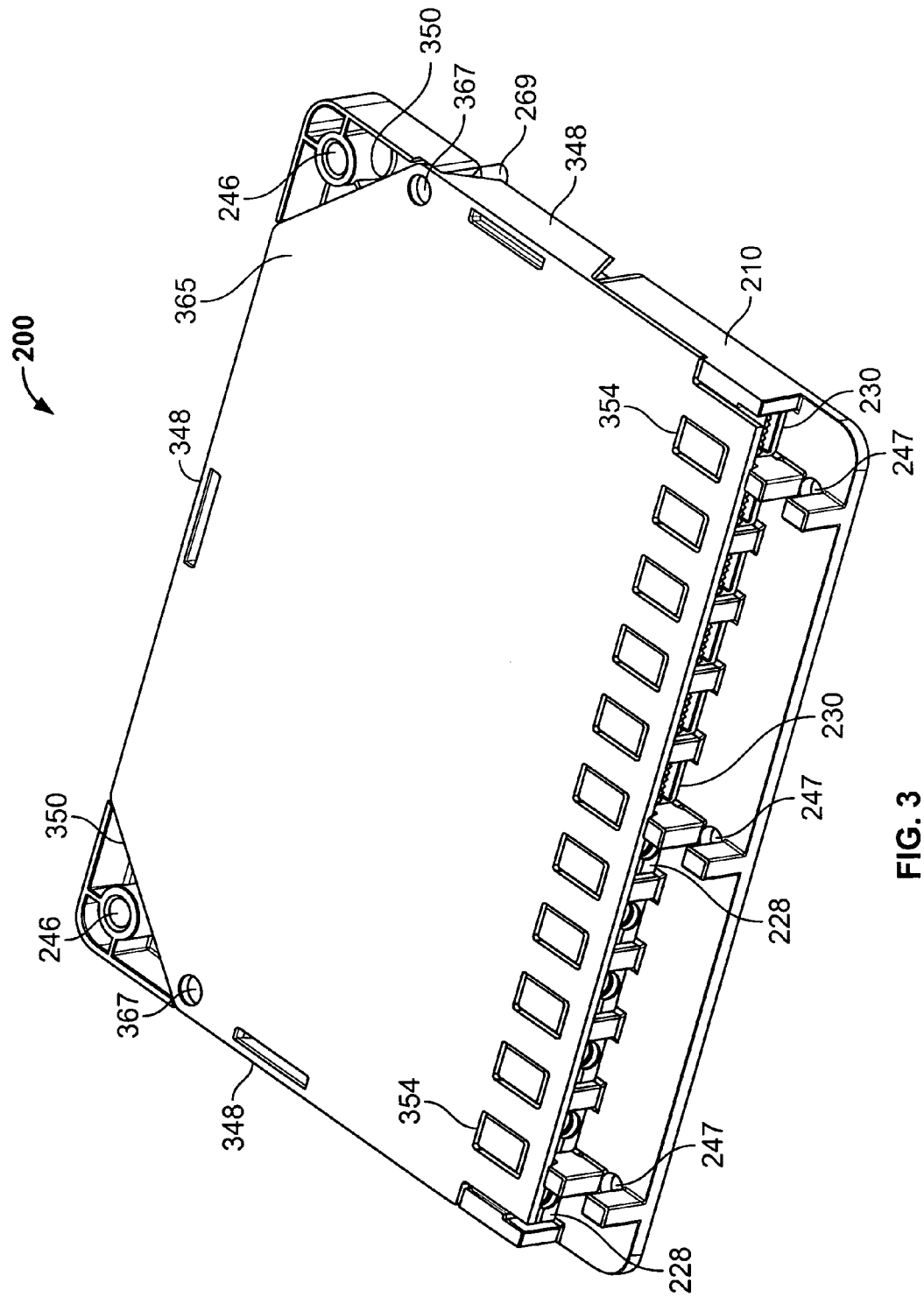
FIG. 3 is a perspective view of the device of FIG. 2 with the cover attached.

Further embodiments of the present invention will now be described with reference to FIGS. 2 and 3. FIG. 2 is a perspective view illustrating an optical fiber fanout device 200 with the cover removed according to some embodiments of the present invention. FIG. 3 is a perspective view of the device of FIG. 2 with the cover 365 attached to the base 210. Base 210 includes a bottom with sidewalls extending up therefrom to define a fiber telescoping cavity 234. The cover 365 defines a top of the fiber telescoping cavity 234. A plurality of insertable furcation tube holding blocks 230 are illustrated that define optical fiber tubing receiving openings into the fiber telescoping cavity 234. The furcation tube holding blocks 230 are configured to receive a plurality of furcation tubes 125 (FIG. 1) fixedly therein.

Also shown are a plurality of multi-fiber holding blocks 228 defining optical fiber receiving openings in the base 210 that extend to the fiber telescoping cavity 234. The multi-fiber holding blocks 228 are displaced from corresponding furcation tube holding blocks 230 by a distance selected to define an arc for an optical fiber extending therebetween that exceeds a minimum bend radius for the optical fiber.

In the embodiments of FIGS. 2 and 3, the base 210 includes a plurality of deformable holding block receiving members, including respective resilient arms 240, retaining tabs 242, end stops 236 and upper retaining tabs 238. The deformable holding block receiving members are configured to slidably receive the holding blocks 228, 230 and to limit longitudinal movement of the holding blocks 228, 230 relative to the fiber telescoping cavity. More particularly, the retaining tab 242 on the resilient arm 240 is configured to limit movement of the holding blocks 228, 230 into the fiber telescoping cavity 234 while the end stop 236 limits longitudinal movement away from the fiber telescoping cavity 234 and the upper retaining tabs 238 limit movement of the holding blocks 228, 230 away from the base 210. The flexible arm 240, in the embodiments of FIG. 2, may be pressed downwardly to allow repeated removal and insertion of a holding block 228, 230 into the base 210.

For the embodiments illustrated in FIG. 2, the furcation tube holding block 230 and the multi-fiber holding block 228 have a common footprint and the deformable holding block receiving members are configured to interchangeably receive either the furcation tube holding block 230 or the multi-fiber holding block 228. Note that the multi-fiber holding block 228 differs from the multi-fiber holding block 128 in that the holding block 228 is a loose tube holding block configured to retain a loose tube including a plurality of optical fibers in the holding block 228, although a common footprint is shown for blocks 128, 228.

The illustrated housing 210 further includes three tab receiving regions 244 configured to receive and engage corresponding tabs 348 of cover 365. The base 210 further includes through holes 246 located outside of the region defining the fiber telescoping cavity 234, with corresponding angled recesses 350 on the cover 365 exposing the openings 246 when the cover 365 is installed on the base 210 as seen in FIG. 3. The embodiments of FIGS. 2 and 3 differ from the embodiments of FIG. 1 in that three mounting holes 247 are provided on the front end of the housing 210 opposite the holes 246 in the embodiments of FIGS. 2 and 3. The stop members 236a proximate the openings 247 are longitudinally extending to provide greater stiffness in the housing 210 proximate the mounting holes 247.

Also shown in the embodiments of FIGS. 2 and 3 are standoffs 269. The standoffs 269 extend from the bottom of the base 210 in a direction away from the fiber telescoping cavity 234. A pair of standoffs 269 (only one visible in FIGS. 2 and 3) are positioned to locate the base (tray) 210 at an angle allowing deformation of the fingers 240 to allow insertion of the holding blocks 228, 230, which may ease assembly of the optical fiber fanout device 200 by an operator. As the optical fiber fanout device 200 is configured for use in a stacked arrangement, standoff receiving members 260 are provided in the base 210 positioned to receive standoffs 269 extending from another base (tray) 210 stacked thereon. As seen in FIG. 3, corresponding openings 367 are provided in the cover 365 to allow for a passage of the standoffs 269 into the standoff receiving members 260. The standoffs 269 may also server as locating features for positioning on a shelf. Also seen in the cover 365 in FIG. 3 are openings 354 positioned and sized to receive the upper retaining tabs 238 and attachment tabs 348 positioned to mate in corresponding tab receiving regions 244 of the base 210.

Figure 4:
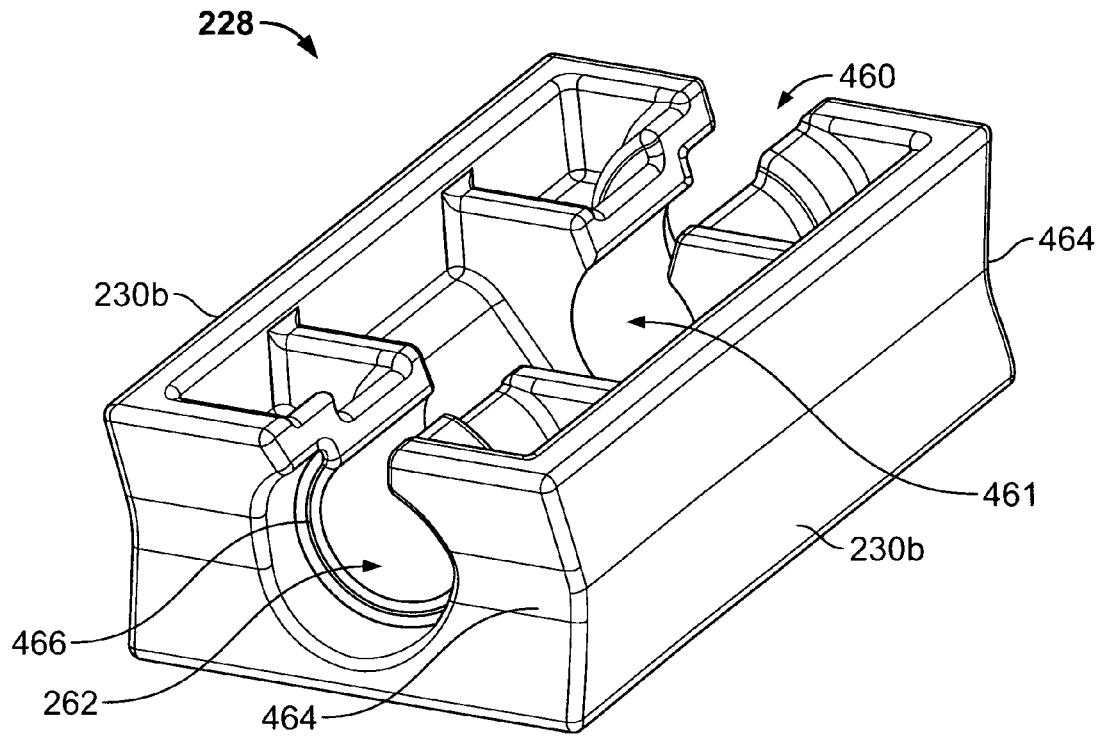
FIG. 4 is a perspective view of a loose tube holding block according to some embodiments of the present invention.

Referring now to FIG. 4, an exemplary one of the loose tube holding blocks 228 (FIG. 2) according to some embodiments of the present invention will now be described. The loose tube holding block 228 has a fiber (loose tube) receiving passageway 262 extending therethrough that is configured to receive a plurality of optical fibers contained within a loose tube and to pass the same to the fiber telescoping cavity 234 (FIG. 2). As also shown in the embodiments of FIG. 4, the fiber receiving passageway 262 has a longitudinally extending opening 460 in an upper portion thereof configured to allow passage of a plurality of optical fibers into the fiber receiving passageway 262 from above and then sliding the loose tube into place, thus requiring a lesser length of the loose tube to be passed through the passageway 262. Thus, in some embodiments as seen in FIG. 4, the width of the opening 460 is less than an outer diameter of loose tube to be inserted in the holding block 228 so that, after passing the loose tube into the passageway 262, the loose tube will not be expected to slip out through the opening 460.

Also shown in the embodiments of FIG. 4 is an adhesive receiving passageway 461 in the loose tube holding block 228. The adhesive receiving passageway 461 extends to the fiber receiving passageway 262 and is configured to receive an adhesive for securing the loose tube containing the plurality of optical fibers in the loose tube holding block 228. In addition, there are adhesive regions 466 (only one shown in FIG. 4) connecting to the fiber receiving passageway 262 approximate longitudinally displaced front and back ends of the fiber receiving passageway 262. The regions 466 are configured to limit or even terminate wicking of adhesive flowing from the adhesive receiving passageway 461 through the fiber receiving passageway 262.

Note that longitudinally displaced front and back ends are shown as including angled faces 464 in FIG. 4 and oppositely placed side faces 230b of the holding block 228 are also shown. As used herein, longitudinal movement refers to movement from the front to back end (or vice-versa). Note that, as seen in FIG. 4, the front and back ends may be identical/symmetrical and reference to front versus back as used herein will be relative to the fiber telescoping cavity 234 (FIG. 2).

Figure 5:
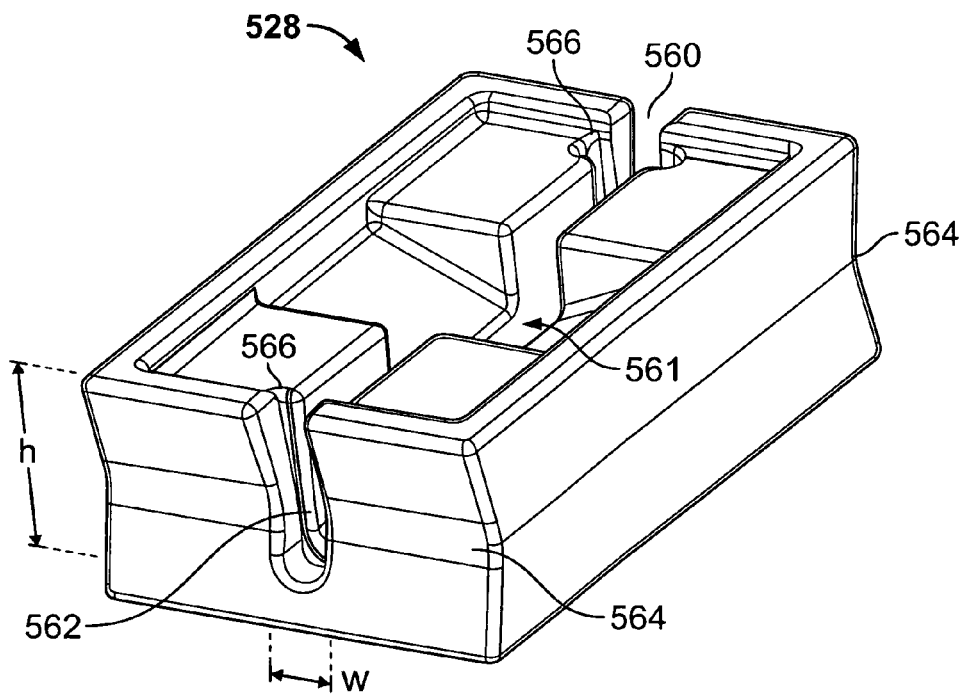
FIG. 5 is a perspective view of a ribbon holding block according to some embodiments of the present invention.

FIG. 5 is a perspective view of an exemplary one of the ribbon holding blocks (item 128 of FIG. 1) 528 according to some embodiments of the present invention. Like the loose tube holding block 228, the ribbon holding block 528 is configured to receiving a multi-fiber grouping of a plurality of optical fibers. However, for the ribbon holding block 528 of FIG. 5, an optical fiber ribbon is received in a fiber receiving passageway 562 that is a longitudinally extending channel having a height h exceeding its width (w) that is configured to receive the optical fiber ribbon and orient the same therein.

The channel 562 extends from an angled front end face 564 of the holding block 528 to an angled back end face 564. Similar angled end faces 464 are shown for the loose tube holding block 228 of FIG. 4. As will be further described with reference to FIG. 8, the angled end faces 564, 464 may be positioned with one facing the fiber telescoping cavity 234 and engaging an angled retaining member 242 to engage the angled end face 464, 564 of the holding block 228, 528 to limit longitudinal movement of the holding block 228, 528 into the fiber telescoping cavity 234.

Also shown in the embodiments of FIG. 5 is an adhesive receiving passageway 561 extending to the fiber receiving passageway 562 that is configured to receive an adhesive for securing an optical fiber ribbon cable in the channel 562. In addition, first and second adhesive receiving regions 566 connecting to the channel 562 proximate respective longitudinally displaced ends of the channel 562 near the angled end faces 564 are configured to terminate wicking of adhesive flowing from the adhesive receiving passageway 561 through the channel 562.

Figure 6:
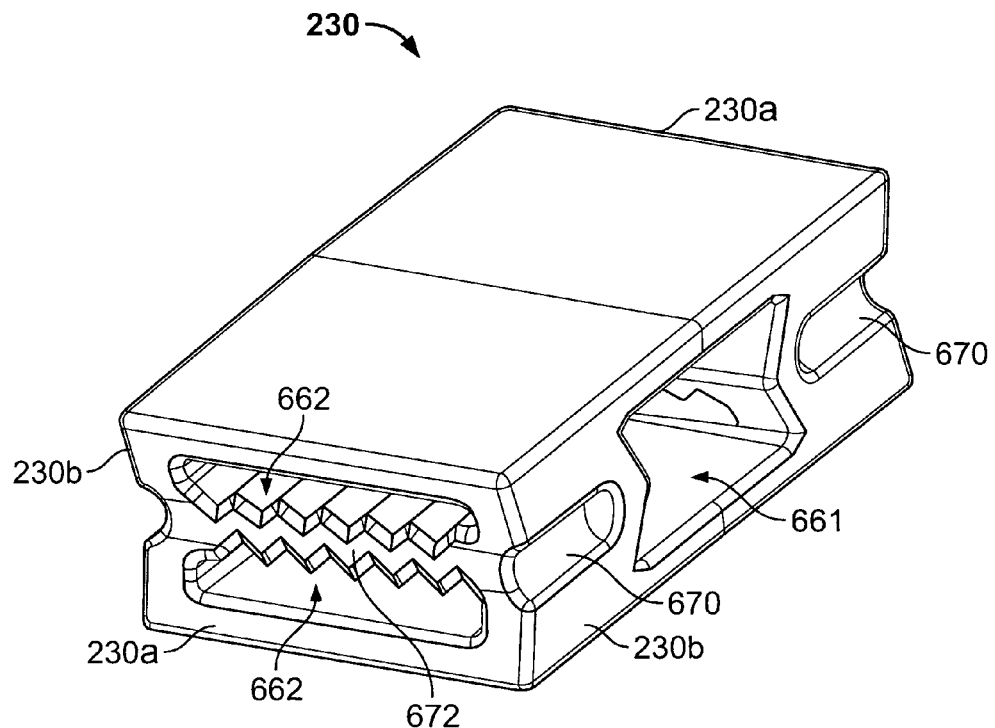
FIG. 6 is a perspective view of a furcation tube holding block according to some embodiments of the present invention.

FIG. 6 is a perspective view of an exemplary one of the furcation tube holding blocks 230 (FIG. 2) according to some embodiments of the present invention. The furcation tube holding block 230 of FIG. 6 is a single piece design. As seen in FIG. 6, the furcation tube holding block 230 includes a furcation tube receiving passageway 662 extending longitudinally therethrough that is configured to receive a plurality of furcation tubes. More particularly, the furcation tube receiving passageway 662, in the embodiments of FIG. 6, includes dual overlying passageways with a jagged wall having a substantially uniform thickness extending therebetween across the furcation tube holding block 230. In addition, an adhesive receiving passageway 661 extends from a sideface of the holding block 230 to the furcation tube receiving passageway 662 that is configured to receive an adhesive for securing the plurality of furcation tubes in the furcation tube holding block 230.

It will be understood that, as used herein, references to furcation tube refer to a flexible protective tube used to surround a singulated optical fiber exiting the optic fiber fanout device 100, 200, which furcation tubes are typically connectorized at an end thereof displaced from the device 100, 200. For example, an SC connector may be coupled to the furcation tube. As such, the singulated optical fiber terminated to the SC connector would be telescoped back into the fiber telescoping cavity 134, 234 by relative thermal contraction of a furcation tube protecting an optical fiber contained therein and connected to the SC connector rigidly attached to the furcation tube.

As with the holding blocks 228, 528 of FIGS. 4 and 5, angled end faces 230a are shown on the furcation tube holding block 230 that may be configured to mate with an angled retaining member 242. In addition, mold cavities 670 are shown in the side faces of the holding block 230 of FIG. 6.

The central wall 672 in the furcation tube holding block 230 defines the first and second passageways 662 that are each configured to receive a plurality of furcation tubes arrayed across a width of the furcation tube holding block 230 at a substantially uniform spacing. Furthermore, a substantially uniform thickness of the central wall 672 is provided that defines an offset, nested relationship between furcation tubes placed in the respective first and second portions of the passageway 662. Thus, the arrangement of the central wall 672 may provide for more uniform molding shrinkage characteristics as well as a nesting of furcation tubes allowing a reduced height of the holding block 230 to accommodate the stacked rows of furcation tubes. Such a stacked rows arrangement of furcation tubes may be particularly beneficial for use with known fixtures for feeding optical fibers into such furcation tubes using air pressure or the like.

Figure 7:
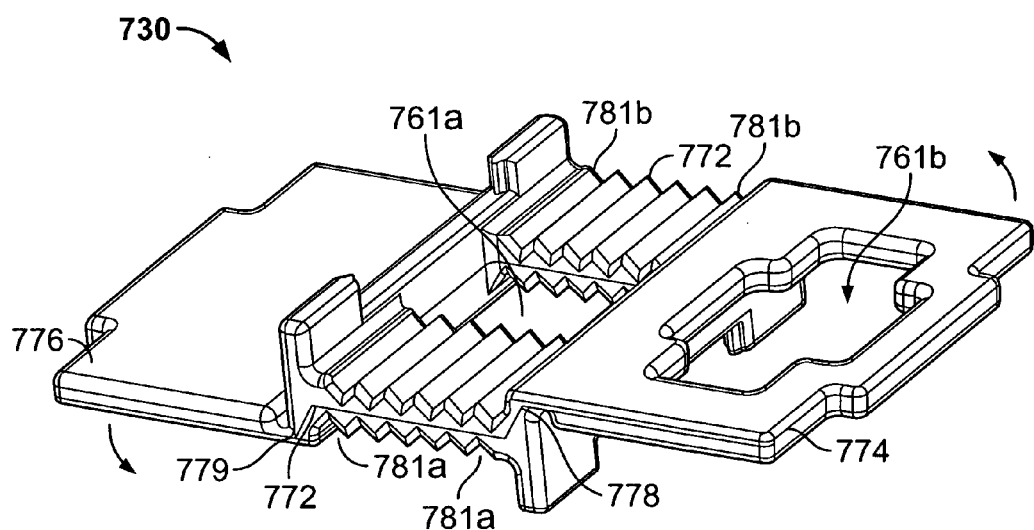
FIG. 7 is a perspective view of a furcation tube holding block according to further embodiments of the present invention.

FIG. 7 is a perspective view of a furcation tube holding block 730 according to further embodiments of the present invention. The furcation tube holding block 730 may be installed in a base substantially as described with reference to the furcation tube holding block 230 above. Similarly, to the embodiments of FIG. 6, the holding block 730 in the embodiments of FIG. 7 includes a central member 772 defining first and second passageways including respective notches 781a, 781b configured to receive a plurality of furcation tubes arrayed across a width of the furcation tube holding block 730 at substantially uniform spacing. In addition, the central member 772 defines a substantially uniform thickness wall between the respective groupings of notches 781a, 781b defining an offset nested relationship between furcation tubes placed in the respective notches 781a, 781b.

For the embodiments illustrated in FIG. 7, the furcation tube holding block 730 also includes a bottom cover 776 hingedly connected to the central member 772 at a hinge 779 and having an open position, as illustrated in FIG. 7, allowing insertion of furcation tubes in the notches 781a and a closed position extending over inserted furcation tubes. A top cover 774 is hingedly connected to the central member 772 at a hinge 778 and has an open position, shown in FIG. 7, allowing insertion of furcation tubes in the notches 781b and a closed position extending over inserted furcation tubes therein. The hinges 778, 779 are shown as living hinges in the embodiments of FIG. 7.

A first adhesive passageway opening 761b is provided in the top cover 774 that is configured to allow adhesive to flow into the upper passageway including the notches 781b. A second adhesive passageway opening 761a in the central member 772 is configured to allow adhesive to flow from the passageway region including the notches 781a. As such, adhesive input to the opening 761b may flow into and around furcation tubes in notches 781a and 781b. However, in some embodiments, adhesive is first provided through opening 761a before installing furcation tubes in notches 781b to facilitate adhesive flow. In contrast, the furcation tube holding block 230 of FIG. 6 uses a side face opening 661 to directly flow adhesive to both portions of the passageway 662. It will further be understood that the furcation tube holding blocks 230, 730, like the loose tube holding block 228 and the ribbon holding block 528, may include respective first and second adhesive receiving regions connected to the furcation tube receiving passageway 662 proximate longitudinally displaced ends of the furcation tube receiving passageway 662 that are configured to limit or even terminate wicking of adhesive flowing from the adhesive receiving passageway 661 through the furcation tube receiving passageway 662.

The holding blocks 228, 528, 230, 730 of FIGS. 4-7 may be a polymeric or plastic material that allows light to be transmitted therethrough. Such a selection of material may facilitate the curing of adhesive in the respective adhesive receiving passageways and optical fiber/furcation tube receiving passageways.

Figure 8:
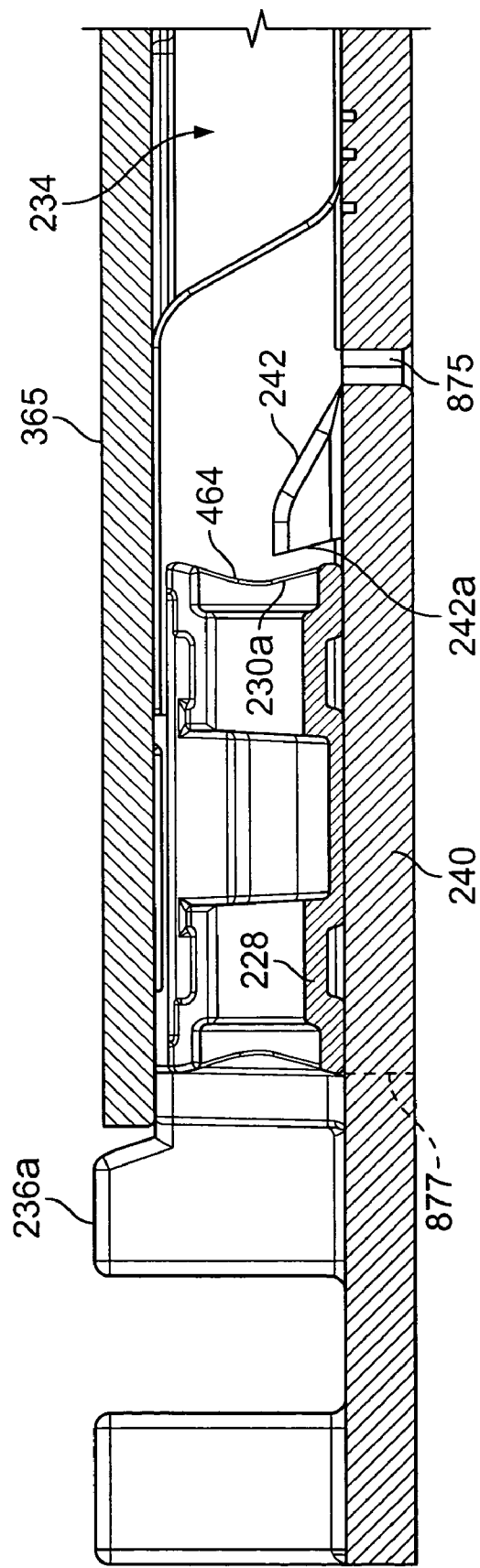
FIG. 8 is cross-sectional view of a loose tube holding block installed in an optical fiber fanout device according to some embodiments of the present invention.

Further embodiments of the present invention will now be described with reference to the cross-sectional view of FIG. 8. FIG. 8 is a cross-sectional view of a loose tube holding block 228 taken along line 8-8 of FIG. 2. As seen in FIG. 8, a loose tube holding block 228 includes an angled end face 230a facing the fiber telescoping cavity 234. The flexible arm 240 of the deformable holding block receiving member includes an angled retaining member 242 with a face 242a configured to engage the angled end face 230a of the loose tube holding block 228 to limit longitudinal movement of the loose tube holding block 228 into the fiber telescoping cavity 234. A reference line 877 in FIG. 8 conceptually illustrates the flexpoint for the flexible arm 240 while an opening 875 marks the opposite end of the flexible arm 240.

As seen in the embodiments of FIG. 8, the end face 230a and retaining member 242 are slightly offset, rather than being in contact. As such, a limited amount of longitudinal movement of the loose tube holding block 228 may be allowed within the deformable holding block receiving member. Furthermore, while a loose tube holding block 228 is illustrated in FIG. 8, it will be understood that a ribbon holding block 528 and/or furcation tube holding block 230, 730 may be similarly received in a deformable holding block receiving member.

Figure 9:
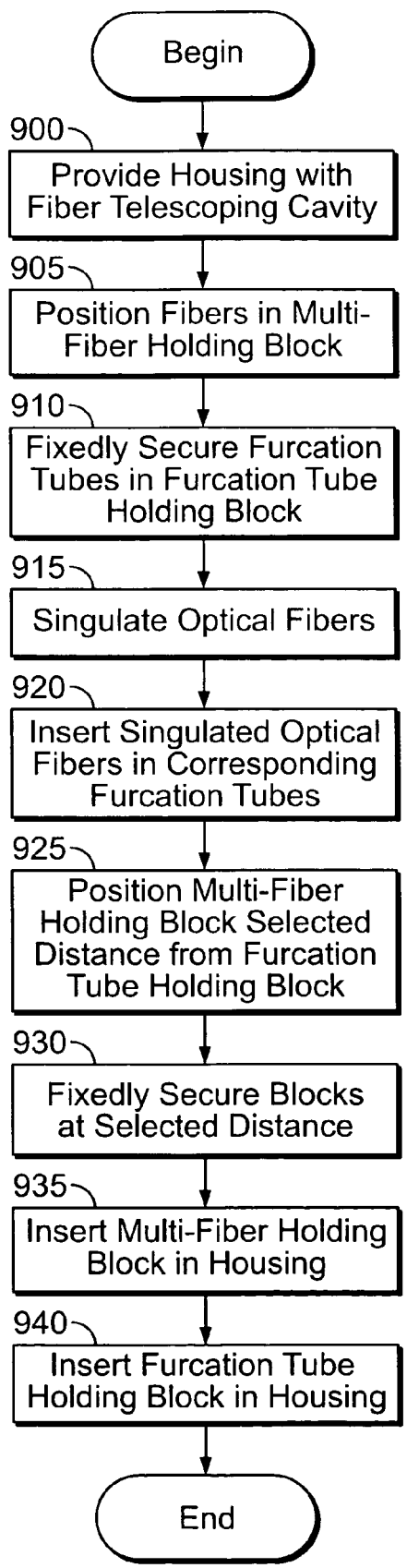
FIG. 9 is a flowchart illustrating operations for forming an optical fiber fanout according to some embodiments of the present invention.

A method of forming an optical fiber fanout device according to some embodiments of the present invention will now be described with reference to the flowchart illustration of FIG. 9. As illustrated in FIG. 9, operations begin by providing a housing having fiber telescoping cavity and a first and second deformable holding block receiving member therein (block 900). The second deformable holding receiving member is positioned at a distance from the first deformable holding block receiving member selected to define an arc for an optical fiber extending therebetween through the fiber telescoping cavity. For example, such an arc may be selected so that the fiber traveling thereon will exceed a minimum bend radius for the optical fiber so as to limit potential for damage to such a fiber during telescoping movement thereof.

A multi-fiber grouping of a plurality of optical fibers, such as a loose tube or ribbon, is positioned in a multi-fiber holding block that is configured to be received in the first and/or second deformable holding block receiving member (block 905). A plurality of furcation tube are fixedly secured in a furcation tube holding block configured to be received in the first and/or second deformable holding block receiving member (block 910). Ones of a plurality of optical fibers in the multi-fiber grouping are singulated (block 915). For example, for a loose tube grouping a selected length of a loose tube is removed to exposed the plurality of optical fibers. For a ribbon, a selected length of the plurality of optical fibers is separated.

The singulated ones of the plurality of optical fibers are inserted in corresponding ones of the furcation tubes (block 920). The furcation tube holding block is positioned a selected longitudinal distance from the multi-fiber holding block with the singulated optical fibers extending therebetween (block 925). The selected distance may be chosen to provide a desired arc length through the fiber telescoping cavity in the assembled optical fiber fanout device.

The furcation tube holding block is fixedly secured at the selected longitudinal distance from the multi-fiber holding block (block 930). Other optical connector installation may also be completed. In some embodiments, operations at block 905 include fixedly securing the multi-fiber grouping of a plurality of optical fibers in the multi-fiber holding block and operations at block 930 include terminating the ones of the plurality of optical fibers in the multi-fiber grouping to a connector fixedly secured to corresponding ones of the furcation tubes. After the holding blocks are secured at the selected longitudinal distance from each other, the multi-fiber holding block is inserted in the first deformable holding block receiving member (block 935) and the furcation tube holding block is inserted in the second deformable holding block receiving member with the singulated optical fibers extending through the fiber telescoping cavity along the defined arc (block 940). Lastly, a cover may be installed on the housing.

As described with reference to FIG. 1, the embodiments of FIGS. 1-8 may be used to provide, for example, a 72 fiber high fiber count optical fanout device.

As described above, various embodiments of an optical fiber fanout device may be easier to assemble compared to a typical conventional potted fanout device. In addition, the space used by, for example, 6 potted fanouts to support 72 fibers is generally the same as the space occupied by a device such as illustrated in FIG. 1. As further described above, adhesive used for securing tubes and/or fiber groupings in some embodiments of the present invention may use a light cured adhesive and polymer materials allowing transmission of light thereto in an efficient manufacturing process. Embodiments of optical fiber fanout devices as described herein may exhibit significantly better temperature induced loss performance as compared to a conventional potted fanout. In addition, devices as described herein according to some embodiments may accept ribbon and/or loose tube inputs whereas a potted fanout typically is applied to ribbon as it may not be possible to effectively use such an approach with a loose tube. For an optical fiber fanout device according to some embodiments, a modular design is provided that uses blocks to hold ribbons or tubes and may be easily assembled. In addition, respective various holding blocks may be designed to promote adhesive flow along selected regions of a pathway and further the flow of adhesive by migration may be limited through the placement of wells that limit or even prevent flow of adhesive beyond the desired end point of the adhesive filled block portions.

As described above, adhesives may be used for fixedly attaching furcation tubes, loose tubes and/or ribbon cable in respective holding blocks. In general, adhesives may be used in a variety of modes of applied stress including shear, peel, cleave, torsion or tension or even mixtures of these stresses. Adhesives are often effective when used in this way. The present inventors determined that, with a variety of adhesives and loose tubes (or furcation tubes), tension or mixed mode stresses (e.g., combinations of tension and/or peel and/or cleavage) sometimes resulted in adhesive joint failures with an unacceptably low amplitude of applied force. However, the present inventors discovered that, when mixed mode stresses were minimized, effectively leaving only shear stress, bonds with sufficiently high strength could be achieved. Therefore, in some embodiments, of fiber fanout holding blocks, the holding blocks are configured to limit opportunities for the application of any stresses other than shear. Such reliable adhesive coupling of the furcation tubes, loose tubes and/or fiber optic ribbons to the fanout housing base is provided by some embodiments of the present invention. The coupling of these fanout components (tubes & ribbons) to the fanout base with an adhesive in some embodiments may be provided with a shear coupling adhesive joint feature integrated directly into the housing and/or by using a holding block component that can be assembled remotely and later installed in the fanout housing.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed:

1. An optical fiber fanout device, comprising:
   a housing having a fiber telescoping cavity therein;
   an optical fiber tubing receiving opening in the housing that extends to the fiber telescoping cavity, the optical fiber tubing receiving opening being configured to secure a plurality of optical fiber tubes therein; and
   an optical fiber receiving opening in the housing that extends to the cavity, the optical fiber receiving opening being displaced from the optical fiber tubing receiving opening by a distance selected to define an arc for an optical fiber extending from the optical fiber receiving opening to the optical fiber tubing receiving opening that exceeds a minimum bend radius for the optical fiber, and
   wherein the fiber telescoping cavity is sized to accommodate the arc for the optical fiber and differential thermal expansion and contraction of the optical fiber without accommodating additional lengths of the optical fiber and without accommodating any additional lengths of any other optical fibers so that the optical fiber and the optical fibers each define only a single semi-circular arc when installed in the optical fiber fanout device.

2. The optical fiber fanout device of claim 1, wherein the optical fiber tubing receiving opening comprises an insertable furcation tube holding block configured to receive a plurality of furcation tubes fixedly therein.

3. The optical fiber fanout device of claim 1, wherein the optical fiber fanout device includes:
   a plurality of the optical fiber tubing receiving openings; and
   a plurality of the optical fiber receiving openings, ones of which are positioned at a distance from corresponding ones of the plurality of optical fiber tubing receiving openings to define respective arcs for optical fibers extending therebetween through the fiber telescoping cavity.

4. The optical fiber fanout device of claim 1, wherein the housing comprises a tray and wherein the tray is configured to be secured in a stack of optical fiber fanout devices.

5. The optical fiber fanout device of claim 1, wherein the optical fiber tubes are adhesively secured in the optical fiber tubing receiving opening and the optical fiber tubing receiving opening is configured to limit movement of the optical fiber tubes in a direction causing peeling of the adhesive in the optical fiber tubing receiving opening and wherein the optical fiber is adhesively secured in the optical fiber receiving opening and the optical fiber receiving opening is configured to limit movement of the optical fiber in a direction causing peeling of the adhesive in the optical fiber receiving opening.

6. An optical fiber fanout device comprising:
a housing having a fiber telescoping cavity therein;
an optical fiber tubing receiving opening in the housing that extends to the fiber telescoping cavity, the optical fiber tubing receiving opening being configured to secure a plurality of optical fiber tubes therein, wherein the optical fiber tubing receiving opening comprises an insertable furcation tube holding block configured to receive a plurality of furcation tubes fixedly therein; and
an optical fiber receiving opening in the housing that extends to the cavity, the optical fiber receiving opening being displaced from the optical fiber tubing receiving opening by a distance selected to define an arc for an optical fiber extending from the optical fiber receiving opening to the optical fiber tubing receiving opening that exceeds a minimum bend radius for the optical fiber,
wherein the housing further includes a deformable holding block receiving member configured to slidably receive the furcation tube holding block and to limit longitudinal movement of the furcation tube holding block relative to the fiber telescoping cavity.

7. The optical fiber fanout device of claim 6, wherein the furcation tube holding block includes a furcation tube receiving passageway extending longitudinally therethrough configured to receive a plurality of furcation tubes and an adhesive receiving passageway therein extending to the furcation tube receiving passageway configured to receive an adhesive for securing the plurality of furcation tubes in the furcation tube holding block.

8. The optical fiber fanout device of claim 7, further comprising first and second adhesive receiving regions connecting to the furcation tube receiving passageway proximate longitudinally displaced ends of the furcation tube receiving passageway that are configured to limit wicking of adhesive flowing from the adhesive receiving passageway through the furcation tube receiving passageway.

9. The optical fiber fanout device of claim 7, wherein the furcation tube holding block comprises a plastic material that allows light to be transmitted therethrough to cure adhesive in the adhesive receiving passageway and the furcation tube receiving passageway.

10. The optical fiber fanout device of claim 7, wherein the furcation tube holding block comprises a central member defining a first and second passageway, each configured to receive a plurality of furcation tubes arrayed across a width of the furcation tube holding block at a substantially uniform spacing, with a substantially uniform thickness wall between the first and second passageway defining an offset nested relationship between furcation tubes placed in the first and second passageways.

11. The optical fiber fanout device of claim 6, wherein the furcation tube holding block includes an angled endface positioned facing the fiber telescoping cavity and wherein the deformable holding block receiving member includes an angled retaining member configured to engage the angled endface of the furcation tube holding block to limit longitudinal movement of the furcation tube holding block into the fiber telescoping cavity.

12. The optical fiber fanout device of claim 6, wherein the optical fiber receiving opening comprises an insertable multi-fiber holding block having a fiber receiving passageway extending therethrough to the fiber telescoping cavity configured to receive a plurality of optical fibers.

13. The optical fiber fanout device of claim 12 wherein the multi-fiber holding block comprises a ribbon holding block and the fiber receiving passageway comprises a longitudinally extending channel having a height exceeding its width configured to receive an optical fiber ribbon cable therein.

14. The optical fiber fanout device of claim 12 wherein the multi-fiber holding block includes an adhesive receiving passageway therein extending to the fiber receiving passageway configured to receive an adhesive for securing the plurality of optical fibers in the multi-fiber holding block and first and second adhesive receiving regions connecting to the fiber receiving passageway proximate longitudinally displaced ends of the fiber receiving passageway that are configured to limit wicking of adhesive flowing from the adhesive receiving passageway through the fiber receiving passageway.

15. The optical fiber fanout device of claim 12 wherein the multi-fiber holding block comprises a loose tube holding block and the fiber receiving passageway has a longitudinally extending opening on an upper portion thereof configured to allow passage of a plurality of optical fibers into the fiber receiving passageway.

16. The optical fiber fanout device of claim 12, wherein the housing further includes a second deformable holding block receiving member configured to slidably receive the multi-fiber holding block and to limit longitudinal movement of the multi-fiber holding block relative to the fiber telescoping cavity, wherein the second deformable holding block receiving member is positioned at a distance from the first deformable holding block receiving member to define the arc for an optical fiber extending from the optical fiber receiving opening to the optical fiber tubing receiving opening.

17. The optical fiber fanout device of claim 16, wherein the furcation tube holding block and the multi-fiber holding block have a common footprint and the deformable holding block receiving members are configured to interchangeably receive either the furcation tube holding block or the multi-fiber holding block.

18. The optical fiber fanout device of claim 17, wherein the first deformable holding block receiving member comprises one of a first plurality of deformable holding block receiving members in the housing and the second deformable holding block receiving member comprises one of a second plurality of deformable holding block receiving members in the housing, ones of the first plurality of deformable holding block receiving members being positioned at a distance from corresponding ones of the second plurality of deformable holding block receiving members to define respective arcs for optical fibers extending therebetween through the fiber telescoping cavity, wherein the optical fiber fanout device includes a plurality of pairs of furcation tube holding blocks and multi-fiber holding blocks positioned in corresponding ones of the deformable holding block receiving members.

19. The optical fiber fanout device of claim 18, further comprising:
groups of a plurality of optical fibers retained in each of the multi-fiber holding blocks;
a plurality of furcating tubes fixedly secured in each of the furcation tube holding blocks; and singulated ones of the optical fibers extending along the respective arcs from each of the multi-fiber holding blocks into corresponding associated ones of the furcation tubes fixedly secured in corresponding ones of the furcation tube holding blocks.

20. The optical fiber fanout device of claim 19, wherein the groups of optical fibers comprise optical fiber ribbons and/or optical fiber loose tubes including a plurality of optical fibers.

21. The optical fiber fanout device of claim 12, wherein the furcation tubes are adhesively secured in the furcation tube holding block and the furcation tube holding block is configured to limit movement of the furcation tubes in a direction causing peeling of the adhesive in the furcation tube holding block and wherein the plurality of optical fibers are adhesively secured in the multi-fiber holding block and the multi-fiber holding block is configured to limit movement of the plurality of optical fibers in a direction causing peeling of the adhesive in the multi-fiber holding block.

22. The optical fiber fanout .device of claim 6, wherein the housing comprises a tray and wherein the tray is configured to be secured in a stack of optical fiber fanout devices and wherein the deformable holding block receiving member is positioned in a bottom of the tray and wherein the tray further comprises standoffs extending from the bottom of the tray in a direction away from the fiber telescoping cavity, the standoffs being positioned to locate the tray at an angle allowing deformation of the deformable holding block receiving member to allow insertion of the furcation tube holding block therein and wherein the tray further comprises standoff receiving members positioned to receive standoffs extending from another tray stacked thereon.

23. A method of forming an optical fiber fanout device, comprising:
provicling a housing having a fiber telescoping cavity and a first and second deformable holding block receiving member therein, the second deformable holding block receiving member being positioned at a distance from the first deformable holding block receiving member to define an arc for an optical fiber extending therebetween through the fiber telescoping cavity;
positioning a multi-fiber grouping of a plurality of optical fibers in a multi-fiber holding block configured to be received in the first and/or second deformable holding block receiving member;
fixedly securing a plurality of furcation tubes in a furcation tube holding block configured to be received in the first and/or second deformable holding block receiving member;
singulating ones of a plurality of optical fibers in the multi-fiber grouping;
inserting the singulated ones of the plurality of optical fibers in corresponding ones of the furcation tubes;
positioning the furcation tube holding block a selected longitudinal distance from the multi-fiber holding block with the singulated optical fibers extending therebetween;
fixedly securing the furcation tube holding block at the selected longitudinal distance from the multi-fiber holding block; and then
inserting the multi-fiber holding block in the first deformable holding block receiving member; and
inserting the furcation tube holding block in the second deformable holding block receiving member with the singulated optical fibers extending through the fiber telescoping cavity along the arc.

24. The method of claim 23, wherein positioning a multi-fiber grouping of a plurality of optical fibers in a multi-fiber holding block comprises fixedly securing the multi-fiber grouping of a plurality of optical fibers in the multi-fiber holding block and wherein fixedly securing the furcation tube holding block at the selected longitudinal distance from the multi-fiber holding block comprises terminating the ones of the plurality of optical fibers in the multi-fiber grouping to a connector fixedly secured to corresponding ones of the furcation tubes.

25. The method of claim 23, wherein the multi-fiber grouping comprises a loose tube including a plurality of individual optical fibers and wherein singulating ones of the plurality of optical fibers comprises removing a selected length of the loose tube to expose the plurality of optical fibers and/or wherein the multi-fiber grouping comprises a ribbon and wherein singulating ones of the plurality of optical fibers comprises separating a selected length of the plurality of optical fibers.

* * * * *